United States Patent Office 2,983,480
Patented May 9, 1961

2,983,480
VALVE STEM AND RECIPROCATING SHAFT SEAL

David G. Greenlie, Weston, Mass., assignor to W. R. Grace & Co., Cambridge, Mass., a corporation of Connecticut Filed July 2, 1956, Ser. No. 595,399

2 Claims. (Cl. 251—335)

This invention is concerned with means for sealing a working chamber, such as a valve chest or pump cylinder, and isolating material passing through the chamber from the glands or packing of the operating shaft, which is effective at high pressures for long operating periods. It is particularly concerned with a gun type compound applicator suitable for applying cements and gasketing materials to industrial components.

Many of these gasketing and sealing compositions have extremely high viscosities, and some are loaded with fillers which are very abrasive. It is a far faster industrial operation to apply such compounds from the nozzle of a pressure gun rather than to "butter" the compositions into place with knives or spreaders. Nevertheless, knives and spreaders are still largely used because, at the very high pressures which are necessary to move these plastic substances through a nozzle, the operation of previous pressure guns has been very erratic; the valves do not operate dependably against the very high pressures opposing their motion; parts rupture, and frequently the apparatus sticks and jams because the stiff, abrasive compositions are driven into the stuffing box packings. In an industrial operation, such as occurrence can be both disrupting and expensive. Many of these cements are catalyzed systems and harden spontaneously in a short time. When a breakdown occurs, it is necessary to clean out the stock tank, the hose lines, pump, and the nozzle immediately. Otherwise, a solid resin would form which would plug the entire apparatus.

Because of the nature of the cements which are used, it is desirable to isolate the compound valve chamber completely, for this makes cleaning the gun a much easier operation. Consequently, a diaphragm has been used as the valve chamber seal. It was my experience in attempts to improve the operation of such guns that no matter what material was used for the diaphragm and no matter how strong it was supposed to be, if it were flexible enough to allow the valve to lift properly, it fractured or was torn loose from the valve stem in a short time. Then the cement was driven into the glands and packing, and the gun ceased to operate.

I have discovered that it is possible to secure long and dependable service from a diaphragm by balancing the forces working on its surface and that this may be done by providing a chamber above the diaphragm which remains constant in volume as the diaphragm moves in and out, and then filling the chamber with a substantially incompressible fluid which preferably is a benign lubricating substance such as bearing grease or heavy oil. The volume change represented by the motion of the valve stem is reflected in the valve or working chamber which increases or decreases slightly in size as the diaphragm moves in or out, but this chamber is always supplied with compound from a pressure source such as a pump. When the diaphragm is given the proper shape so that there is no change in the volume of the pressure-balancing chamber as the diaphragm moves in response to the action of the valve, pressures above and below the diaphragm remain substantially balanced at all times, and no force exists which tends to tear the diaphragm loose from the valve stem or force a rapidly hardening material into glands, packings, or bearings. A compound applicator gun is chosen as the preferred example of an application of my invention.

Figure 1:
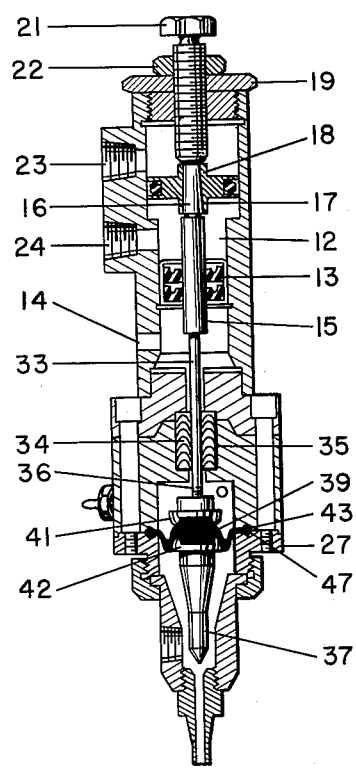
Figure 1 is a vertical section through the improved gun, showing the valve in open position.

The gun comprises a pneumatic valve actuator body 10 having an axial bore, the upper portion 11 of which forms an air cylinder while the lower bore portion 12 houses the packing gland 13. Piston rod 15 passes through gland 13. Its upper tapered end 16 is fitted into a tapered seat 17 formed in piston 18 and is anchored by a pin.

Cylinder 11 is closed by cylinder cap 19, through which valve lift adjusting screw 21 extends. The screw 21 is locked by jam nut 22. Air is admitted and exhaused both above and below the piston 18 through the ports 23 and 24.

Chest 25 is bolted at 26 onto the actuator body 10 by bolts which extend through the body of the chest and are tapped into chest bottom plate 27. A threaded extension 28 of plate 27 extends outwardly from the plate on which retaining nut 29 is screwed to hold compound receptor 31 tightly against extension 28. A combined valve seat and nozzle tip 32 is screwed into the end of the receptor 31.

An extension 33 of piston rod 15 passes through the chevron packings 34 which are housed in counterbore 35 in chest 25 and ends in a terminal threaded portion 36 onto which the valve needle 37 is screwed. Diaphragm 39, formed of a grease resistant rubber-like material, for example, acrylonitrile rubber, is held on the piston rod extension 33 by being pinched between holding flange 41, fastened on rod extension 33, and flange 42 formed on valve needle 37. A thick peripheral bead 43 is molded in the diaphragm 39 which on assembly is pinched in circumferential channels 46 and 47 cut in the face of chest 25 and end plate 27.

Figure 2:
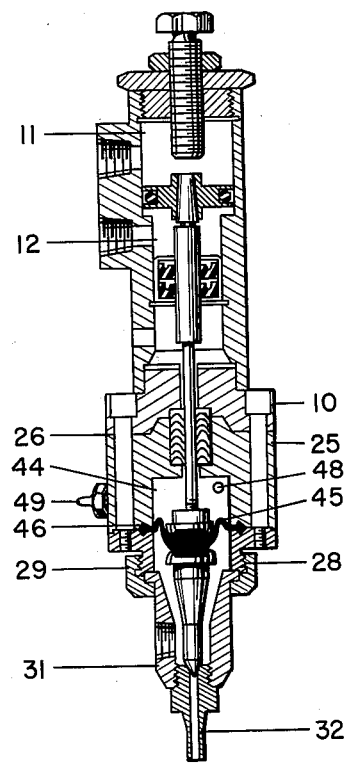
Figure 2 is the same section showing the valve closed.
Figure 3:
Figure 3 is a diagrammatic cross section of the diaphragm when the valve is in the open position of Figure 1.
Figure 4:
Figure 4 is a diagrammatic cross section of the diaphragm when the valve is in the closed position of Figure 2.

It will be noted that the diaphragm lies downwardly in Figure 1 and upwardly in Figure 2 and seals off a counterbored space 44 in chest 25 which encompasses closely the same volume in the open position (Figure 1) as in the closed position (Figure 2). Space 44 is consequently a constant volume chamber. To provide for filling this chamber, a small bore 48 is drilled through the wall of the chest. The outer end of bore 48 is closed by a pressure type grease fitting 49.

A corrugation of the proper size may be molded in the diaphragm, but I find it simpler to make the diaphragm substantially flat, save for the central boss and the peripheral bead, but cause its free diameter to be substantially greater than the diameter of the holding channels 46 and 47 which are cut in the face of chest 25 and end plate 27. Being flexible, the peripheral bead 43 can be crowded into the channels, and the crowding results in a circular buckle or corrugation 45 which allows the diaphragm to flip in and out as the valve needle is lowered or raised.

As the gun is assembled, light lubricating grease is loaded into chamber 44 displacing the air. Normally, when the packing becomes covered with grease and possibly swells slightly, the gun will remain tight throughout a prolonged service period. When grease does work past the packings, it will appear as a drop in the relief port 14. This is a signal that make-up grease should be added which is done by pumping grease from a conventional grease gun through the fitting 49 and bore 48 until an additional drop of grease appears in the relief port 14.

Maintenance of this gun is extremely easy. The only substance which can work past the chevron packings is lubricating grease which in no way interferes with the operation of the gun. The parts which are exposed to compound may be disassembled for cleaning merely by backing off nut 29 and wiping off the valve stem and diaphragm, and if abrasion resistance is demanded, receptor, nozzle tip and valve needle may be made of abrasion resistant alloys which can be furnished as change parts.

Although an applicator gun has been chosen as my preferred example, this seal is broadly useful whenever high pressures are encountered and reciprocating shafts and their packings must be protected from abrasive or reactive materials.

I claim:

1. In a valve casing having a flow controlling chamber and a pressure balancing chamber, a diaphragm formed from a grease-resistant rubber-like material and forming a common transversely extending wall between the two chambers and having an edge portion detachably fastened to said casing, said flow controlling chamber having an inlet and outlet passage and movable valve means to close the outlet passage, means to load the pressure balancing chamber with a fixed volume of an incompressible fluid, and means connected to a movable portion of said diaphragm to reciprocate the movable valve means and to cause the diaphragm to flex, the improvement which consists in providing said diaphragm with a flat web portion and a beaded edge portion, said casing having clamping means adapted to receive and detachably clamp said edge portion, the aforesaid clamping means being channels into which the beaded edge is received and crowded, the crowding resulting in a circular buckle permitting the diaphragm to flip in and out as the movable valve means reciprocates, said edge portion of said diaphragm in the unconfined state having a substantially greater diameter than the diameter of said clamping means and wherein slackness is formed in the diaphragm by confining the edge portion of said diaphragm to said lesser diameter than the unconfined diameter when said edge portion is clamped within said casing, the diaphragm having sufficient slackness and the clamped portion being so related to the movable portion of the diaphragm that in both the open and the closed positions of the movable valve means the slackness of the diaphragm causes the enclosed volume of the pressure balancing chamber to remain constant, the plane of the clamping means lying substantially midway between the travel limits of the center of the diaphragm in open and closed positions of the valve whereby to produce overcentering of the diaphragm so that the diaphragm will flip in and out during actuation of the valve.

2. A valve casing as claimed in claim 1 wherein the grease resistant rubber-like material is acrylonitrile rubber.

References Cited in the file of this patent

UNITED STATES PATENTS

| | | |
|---|---|---|
| 351,828 | Bushnell | Nov. 2, 1886 |
| 607,265 | McLean | July 12, 1898 |
| 695,378 | Cowles | Mar. 11, 1902 |
| 2,444,703 | Jones | July 6, 1948 |
| 2,597,474 | Griffith | May 20, 1952 |
| 2,699,801 | Schleyer | Jan. 18, 1955 |
| 2,742,785 | St. Clair | Apr. 24, 1956 |
| 2,743,738 | Johnson | May 1, 1956 |
| 2,880,620 | Bredtschneider | Apr. 7, 1959 |